United States Patent
Kim et al.

(10) Patent No.: US 7,627,408 B2
(45) Date of Patent: Dec. 1, 2009

(54) METHOD FOR MEASURING VERTICAL ACCELERATION AND VELOCITY OF SEMI-ACTIVE SUSPENSION SYSTEM

(75) Inventors: Wan Il Kim, Gyeonggi-do (KR); Jeong Woo Lee, Gyeonggi-do (KR)

(73) Assignee: Mando Corporation, Seoul (KR)

(*) Notice: Subject to any disclaimer, the term of this patent is extended or adjusted under 35 U.S.C. 154(b) by 638 days.

(21) Appl. No.: 11/264,128

(22) Filed: Nov. 2, 2005

(65) Prior Publication Data

US 2007/0100522 A1    May 3, 2007

(51) Int. Cl.
*B60G 17/018*    (2006.01)
*B60G 17/015*    (2006.01)

(52) U.S. Cl. .......................... 701/37; 280/5.5
(58) Field of Classification Search .......... 701/37, 701/39; 280/5.5
See application file for complete search history.

(56) References Cited

U.S. PATENT DOCUMENTS

| | | | |
|---|---|---|---|
| 5,131,876 A | | 7/1992 | Vieux et al. |
| 5,408,411 A | | 4/1995 | Nakamura et al. |
| 5,475,596 A | | 12/1995 | Henry et al. |
| 5,944,763 A | * | 8/1999 | Iwasaki .......... 701/37 |
| 5,987,369 A | * | 11/1999 | Kwak et al. ..... 701/37 |
| 6,019,495 A | * | 2/2000 | Yamada et al. ... 701/37 |
| 6,092,011 A | * | 7/2000 | Hiramoto ........ 701/37 |
| 6,157,879 A | * | 12/2000 | Kwack et al. .... 701/37 |
| 6,366,841 B1 | * | 4/2002 | Ohsaku .......... 701/37 |

FOREIGN PATENT DOCUMENTS

| | | |
|---|---|---|
| DE | 10320809 | 11/2004 |
| EP | 0392507 | 10/1990 |
| EP | 1226986 | 7/2002 |
| JP | 07-040728 | 2/1995 |

OTHER PUBLICATIONS

Search Report dated May 19, 2006.

* cited by examiner

*Primary Examiner*—Jack W. Keith
*Assistant Examiner*—Helal A Algahaim
(74) *Attorney, Agent, or Firm*—McDermott Will & Emery LLP

(57) ABSTRACT

The present invention relates to a method for measuring a vertical acceleration and a velocity of a semi-active suspension system. Particularly, the present invention provides a method for obtaining a vertical acceleration from vertical accelerations measured from three vertical acceleration sensors of a semi-active suspension system of a vehicle, comprising the steps of: receiving first to third vertical accelerations measured from first to third vertical acceleration sensors; and obtaining a fourth vertical acceleration (Ad) by multiplying the first to third vertical accelerations by correction constants and subsequently summing up them. Therefore, according to the present invention, a fourth vertical acceleration can be obtained by multiplying the three vertical accelerations measured from the three acceleration sensors by the constants for correcting them to accelerations at actually desired damper positions and subsequently summing up them, thereby enabling accurate measurement and correction of the vertical accelerations.

4 Claims, 4 Drawing Sheets

METHOD FOR MEASURING VERTICAL ACCELERATION AND VELOCITY OF SEMI-ACTIVE SUSPENSION SYSTEM

BACKGROUND OF THE INVENTION

1. Field of Invention

The present invention relates to a semi-active suspension system of a vehicle, and more particularly, to a method for measuring a vertical acceleration of a semi-active suspension system.

2. Description of the Prior Art

In general, a semi-active suspension system is an apparatus for improving the driving stability and ride comfort of a vehicle by changing the dynamic characteristics of dampers mounted in a vehicle in real time. When a driver excessively steers a vehicle or the movement of the vehicle is out of its path, load unbalance of the vehicle causes the vehicle to be biased or not to be steerable so that the driver may be in unpredictable danger such as vehicle overturn. However, when a vehicle, which is mounted with the semi-active suspension system, drives on an uneven road, a vertical load at a contact surface of a tire and the road is kept at an appropriate level, so that the stability of the vehicle can be secured in steering, braking and driving. In addition, irregular shocks generated from the road when the vehicle travels are effectively absorbed, so that the ride comfort and driving convenience can be provided to a passenger and a driver.

Such a semi-active suspension system controls actuators and dampers respectively connected to four road wheels after detecting the driving conditions of the vehicle through vertical acceleration sensors, vehicle velocity sensors, a steering angle sensor, a brake sensor, a throttle position sensor, and the like among a variety of sensors mounted to the vehicle.

Among them, the vertical acceleration sensors are installed adjacent to four dampers. However, since there is a difference between the practical mounting positions of the acceleration sensors and the installation positions of the dampers, it is difficult to accurately measure the accelerations of the road wheels.

In a prior art, three vertical accelerations are measured through two vertical acceleration sensors mounted in front of a vehicle body and a vertical acceleration sensor mounted at the rear thereof in the vicinity of the respective dampers, and a fourth vertical acceleration is obtained in such a manner that an ECU receives the three vertical accelerations and calculates the other vertical acceleration using Equation 1 as follows:

$$a_{RL} = a_{RR} + \frac{t_R}{t_F} \cdot (a_{FL} - a_{FR}), \quad (1)$$

where $a_{FL}$ is a vertical acceleration of a front left side, $a_{FR}$ is a vertical acceleration of a front right side, $a_{RL}$ is a vertical acceleration of a rear left side, $a_{RR}$ is a vertical acceleration of a rear right side, $t_F$ is a front tread, and $t_R$ is a rear tread.

Since it is difficult to accurately obtain a fourth vertical acceleration through calculation using the three vertical accelerations and the threads of the road wheels, there is a problem with accurate determination of the dynamic characteristics of the vehicle.

Further, in the prior art, there is also a problem in that it is difficult to accurately obtain a velocity even upon calculation thereof from three velocity sensors.

SUMMARY OF THE INVENTION

Accordingly, the present invention is conceived to solve the aforementioned problems in the prior art. An object of the present invention is to provide a method for measuring vertical accelerations of a semi-active suspension system capable of accurately measuring and correcting the vertical accelerations in such a manner that vertical accelerations measured from three acceleration sensors are multiplied by constants for correcting them to accelerations at actually desired positions and are then summed up so as to obtain a fourth vertical acceleration.

Another object of the present invention is to provide a method for measuring velocities of a semi-active suspension system capable of accurately measuring and correcting the velocities in such a manner that three velocities measured from three velocity sensors are multiplied by constants for correcting them to velocities at actually desired positions and are then summed up so as to obtain a fourth velocity.

According to an aspect of the present invention for achieving the objects, there is provided a method for controlling a semi-active suspension system, wherein the semi-active suspension system comprises the first to third vertical acceleration sensors which are installed adjacent to three of the four dampers of the vehicle body, comprising the steps of obtaining a vertical acceleration value(Ad) at the position of the fourth damper using said first to third vertical accelerations and the correction constants $\alpha$, $\beta$, $\gamma$ at the position of the fourth damper where any vertical acceleration sensor is not installed adjacently, wherein the correction constants at the position of the fourth damper is obtained from x and y position value of the fourth damper and X and Y position values of the first to the third acceleration sensors; and controlling damping forces of the first to fourth dampers according to vertical acceleration values including said vertical acceleration value(Ad) at the position of the fourth damper.

According to another aspect of the present invention, there is provided a method for controlling a semi-active suspension system, wherein the semi-active suspension system comprises the first to third velocity sensors which are installed adjacent to three of the four dampers of the vehicle body, comprising the steps of receiving first to third velocities measured from first to velocity sensors; obtaining a velocity value (Vd) at the position of the fourth damper using said first to third velocities and the correction constants $\alpha$, $\beta$ and $\gamma$ at the position of the fourth damper where any velocity sensor is not installed adjacently, wherein the correction constants at the position of the fourth damper is obtained from x and y position value of the fourth damper and X and Y position values of the first to the third velocity sensors; and controlling damping forces of the first to fourth dampers according to velocity values including said velocity value(Vd) at the position of the fourth damper.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE PREFERRED EMBODIMENT

Hereinafter, preferred embodiments of the present invention will be described in detail with reference to the accompanying drawings.

Figure 1:
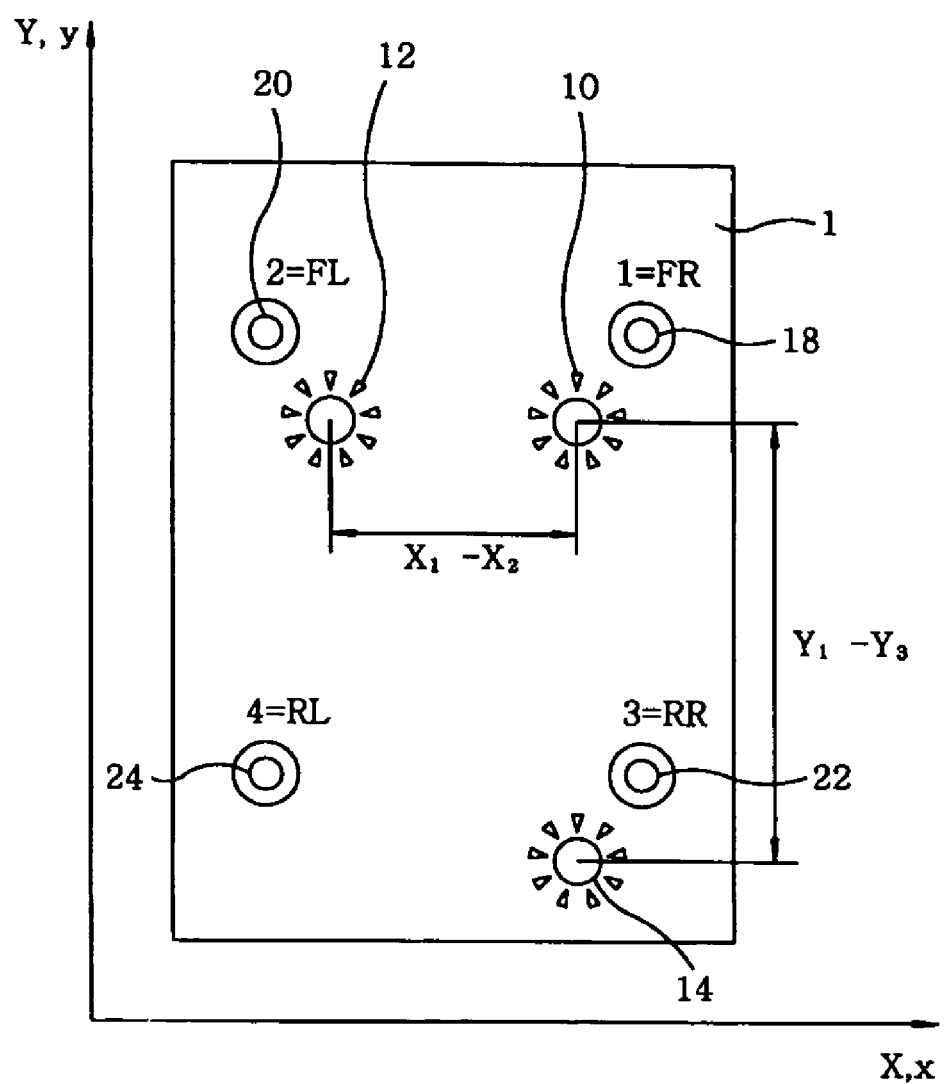
FIG. 1 is a view showing positions of four dampers and three vertical acceleration sensors of a vehicle employing a semi-active suspension system.

FIG. 1 is a view showing positions of four dampers and three vertical acceleration sensors of a vehicle employing a semi-active suspension system. Referring to this figure, two vertical acceleration sensors 10 and 12 are mounted adjacent to front dampers 18 and 20 on a vehicle body 1, respectively, while a vertical acceleration sensor 14 is mounted adjacent to one of rear dampers 22 and 24. Here, when "X" designates a width direction of the vehicle body and "Y" designates a longitudinal direction thereof, the positions of the two front vertical acceleration sensors 10 and 12 are indicated by coordinates $(X_2, Y_2)$ and $(X_1, Y_1)$, respectively, and the position of the rear vertical acceleration sensor 14 is indicated by coordinates $(X_3, Y_3)$. Reference numerals 1=FR, 2=FL, 3=RR, and 4=RL, which have not yet been explained, designate the positions of the first damper 18 at the front left side, the second damper 20 at the front right side, the third damper 22 at the rear left side, and the fourth damper 24 at the rear right side, respectively.

In the present invention, correction constants for a vertical acceleration to be measured at a position where a fourth vertical acceleration sensor would be installed are obtained using the X and Y position coordinate values (for example, $X_1$-$X_2$ and $Y_1$-$Y_3$) of the three vertical acceleration sensors 10, 12 and 14.

Figure 2:
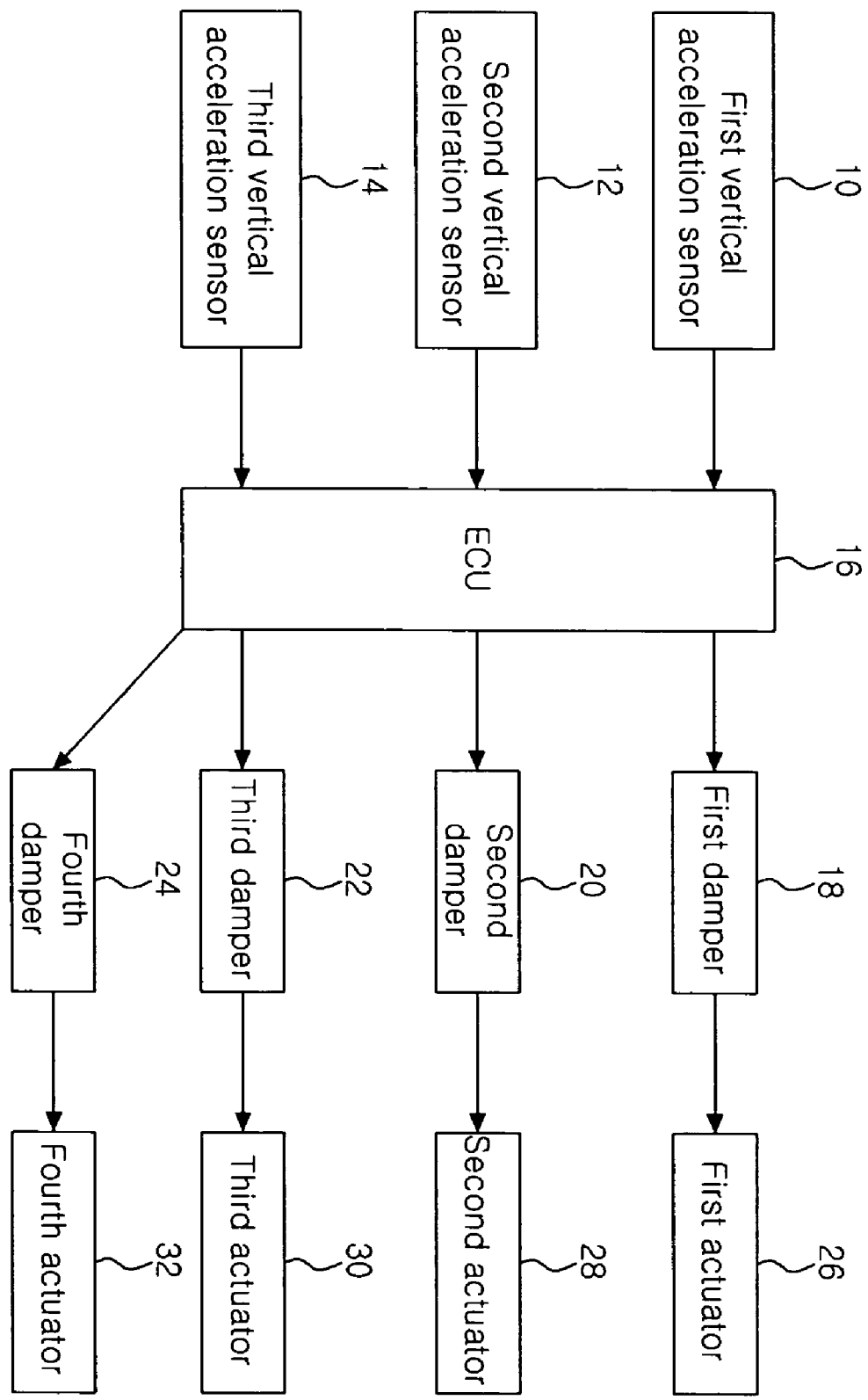
FIG. 2 is a block diagram of the semi-active suspension system, illustrating a method for measuring a vertical acceleration according to the present invention.

FIG. 2 is a block diagram of the semi-active suspension system, illustrating a method for measuring a vertical acceleration according to the present invention. Referring to this figure, the semi-active suspension system comprises the first to third vertical acceleration sensors 10, 12 and 14, an ECU 16, the first to fourth dampers 18, 20, 22 and 24, and first to fourth actuators 26, 28, 30 and 32.

Each of the first to third vertical acceleration sensors 10, 12 and 14, which are installed adjacent to three of the four dampers of the vehicle body, is a sensor for measuring a bounce motion of the vehicle and outputting a vertical acceleration corresponding to the bounce motion of the vehicle body, as a voltage on a gravitational acceleration basis.

A microprocessor is used for the ECU 16, and the ECU includes control algorithms for bounce, roll, dive, squat and the like based on sky-hook logic for independently controlling damping forces of the dampers of respective road wheels.

The first to fourth dampers 18, 20, 22 and 24 are equipped with variable valves at lateral sides thereof so as to adjust the damping forces for use in controlling the first to fourth actuators 26, 28, 30 and 32 when the dampers are extended and retracted.

In the semi-active suspension system configured as above, the method for measuring the vertical acceleration according to the present invention is performed as follows.

Vertical accelerations Aa1, Aa2 and Aa3 measured by the respective first to third vertical acceleration sensors 10, 12 and 14 are input into the ECU 16.

The ECU 16 receives the vertical accelerations Aa1, Aa2 and Aa3 measured by the respective first to third vertical acceleration sensors 10, 12 and 14 and obtains a fourth vertical acceleration Ad using Equation 2 as follows:

$$Ad = \alpha \times Aa1 + \beta \times Aa2 + \gamma \times Aa3, \quad (2)$$

where $\alpha$, $\beta$ and $\gamma$ are correction constants for the position of the fourth damper where a fourth vertical acceleration sensor is not installed. Ad is the the fourth vertical acceleration, and Aa1, Aa2 and Aa3 are the first to third vertical accelerations, respectively.

Referring to Equation 2, the fourth vertical acceleration Ad at the position of the fourth damper where a vertical acceleration sensor is not installed is obtained by multiplying the vertical accelerations Aa1, Aa2 and Aa3 measured in the first to third vertical acceleration sensors 10, 12 and 14 by the corresponding correction constants $\alpha$, $\beta$ and $\gamma$ and subsequently summing up the first to third accelerations that have been multiplied by the correction constants.

At this time, the correction constants $\alpha$, $\beta$ and $\gamma$ are obtained from the following procedures.

For example, assuming that a plane equation $\underline{P}$ for the vertical acceleration sensors installed on the vehicle body is $Z = AX + BY + C$, all the coordinate values of the respective vertical acceleration sensors are included in the equation $\underline{P}$.

$$(X1, Y1, Z1), (X2, Y2, Z2), (X3, Y3, Z3) \in P, \quad (3)$$

where A, B and C are constants, which are expressed as the following Equations 4 to 6, respectively.

$$A = \frac{(Z_1 - Z_2)(Y_1 - Y_3) - (Z_1 - Z_3)(Y_1 - Y_2)}{(X_1 - X_2)(Y_1 - Y_3) - (X_1 - X_3)(Y_1 - Y_2)} \quad (4)$$

$$B = \frac{(X_1 - X_2)(Z_1 - Z_3) - (X_1 - X_3)(Z_1 - Z_2)}{(X_1 - X_2)(Y_1 - Y_3) - (X_1 - X_3)(Y_1 - Y_2)} \quad (5)$$

$$\begin{aligned} C &= Z1 - AX1 - BY1 \\ &= Z2 - AX2 - BY2 \\ &= Z3 - AX3 - BY3 \end{aligned} \quad (6)$$

At this time, assuming that the installation positions of the three vertical acceleration sensors are upper points on the dampers and in a common plane and Y coordinate values of the front first and second vertical acceleration sensors are the same (i.e., $Y_1 = Y_2$), the three vertical acceleration sensors output the accelerations of $\ddot{z}_1$, $\ddot{z}_2$ and $\ddot{z}_3$, respectively.

The plane equation for the first to fourth dampers installed on the vehicle body is considered to be $z = Ax + By + C$, and is then subjected to second differentiation. At this time, the positions of the dampers are expressed using x and y.

$$\frac{d^2 z}{dt^2} = \frac{d^2 A}{dt^2} x + \frac{d^2 B}{dt^2} y + \frac{d^2 C}{dt^2} \quad (7)$$

$$\frac{d^2 A}{dt^2}(Z_1, Z_2, Z_3) = \frac{\partial A}{\partial Z_1} \ddot{Z}_1 + \frac{\partial A}{\partial Z_2} \ddot{Z}_2 + \frac{\partial A}{\partial Z_3} \ddot{Z}_3, \quad (8)$$

where $\frac{\partial Z_i}{\partial t^2} = \ddot{Z}_i$.

Since A is a function of Z1, Z2 and Z3 and Z1, Z2, and Z3 are also functions of time, a derivative of A with respect to time is expressed as Equation 8 using a chain rule. Equation 8 can be expressed as Equation 9 by rearranging it according to the accelerations of the respective sensors after expanding Equation 8 with respect to respective coefficients.

$$\frac{d^2 z}{d t^2} = \left(\frac{\partial A}{\partial Z_1}x + \frac{\partial B}{\partial Z_1}y + \frac{\partial C}{\partial Z_1}\right)\ddot{Z}_1 + \quad (9)$$
$$\left(\frac{\partial A}{\partial Z_2}x + \frac{\partial B}{\partial Z_2}y + \frac{\partial C}{\partial Z_2}\right)\ddot{Z}_2 +$$
$$\left(\frac{\partial A}{\partial Z_3}x + \frac{\partial B}{\partial Z_3}y + \frac{\partial C}{\partial Z_3}\right)\ddot{Z}_3$$

$$\frac{d^2 z}{d t^2} = \alpha(x, y)\ddot{Z}_1 + \beta(x, y)\ddot{Z}_2 + \gamma(x, y)\ddot{Z}_3 \quad (10)$$

Thus, the correction constants $\alpha$, $\beta$ and $\gamma$ at the damper positions $(x, y)$ of the dampers are expressed as the following Equation 11.

$$\alpha(x, y) = \frac{\partial A}{\partial Z_1}x + \frac{\partial B}{\partial Z_1}y + \frac{\partial C}{\partial Z_1} \quad (11)$$
$$\beta(x, y) = \frac{\partial A}{\partial Z_2}x + \frac{\partial B}{\partial Z_2}y + \frac{\partial C}{\partial Z_2}$$
$$\gamma(x, y) = \frac{\partial A}{\partial Z_3}x + \frac{\partial B}{\partial Z_3}y + \frac{\partial C}{\partial Z_3}$$

$$\frac{\partial A}{\partial Z_1}, \frac{\partial A}{\partial Z_2} \text{ and } \frac{\partial A}{\partial Z_3}$$

existing in Equation 9 and the correction constants $\alpha$, $\beta$ and $\gamma$ can be obtained as the following Equation 12.

$$\frac{\partial A}{\partial Z_1} = \frac{Y_2 - Y_3}{(X_1 - X_2)(Y_1 - Y_3) - (X_1 - X_3)(Y_1 - Y_2)} \quad (12)$$
$$\frac{\partial A}{\partial Z_2} = \frac{Y_3 - Y_1}{(X_1 - X_2)(Y_1 - Y_3) - (X_1 - X_3)(Y_1 - Y_2)}$$
$$\frac{\partial A}{\partial Z_3} = \frac{Y_1 - Y_2}{(X_1 - X_2)(Y_1 - Y_3) - (X_1 - X_3)(Y_1 - Y_2)}$$

Further, $$\frac{\partial B}{\partial Z_1}, \frac{\partial B}{\partial Z_2} \text{ and } \frac{\partial B}{\partial Z_3}$$

existing in Equation 9 and the correction constants $\alpha$, $\beta$ and $\gamma$ can be obtained as the following Equation 13.

$$\frac{\partial B}{\partial Z_1} = \frac{X_3 - X_2}{(X_1 - X_2)(Y_1 - Y_3) - (X_1 - X_3)(Y_1 - Y_2)} \quad (13)$$
$$\frac{\partial B}{\partial Z_2} = \frac{X_1 - X_3}{(X_1 - X_2)(Y_1 - Y_3) - (X_1 - X_3)(Y_1 - Y_2)}$$
$$\frac{\partial B}{\partial Z_3} = \frac{X_2 - X_1}{(X_1 - X_2)(Y_1 - Y_3) - (X_1 - X_3)(Y_1 - Y_2)}$$

Furthermore, $$\frac{\partial C}{\partial Z_1}, \frac{\partial C}{\partial Z_2} \text{ and } \frac{\partial C}{\partial Z_3}$$

existing in Equation 9 and the correction constants $\alpha$, $\beta$ and $\gamma$ can be obtained as the following Equation 14.

$$\frac{\partial C}{\partial Z_1} = 1 - \frac{\partial A}{\partial Z_1}X_1 - \frac{\partial B}{\partial Z_1}Y_1 \quad (14)$$
$$= \frac{X_2 Y_3 - X_3 Y_2}{(X_1 - X_2)(Y_1 - Y_3) - (X_1 - X_3)(Y_1 - Y_2)}$$
$$\frac{\partial C}{\partial Z_2} = 1 - \frac{\partial A}{\partial Z_2}X_2 - \frac{\partial B}{\partial Z_2}Y_2$$
$$= \frac{X_3 Y_1 - X_1 Y_3}{(X_1 - X_2)(Y_1 - Y_3) - (X_1 - X_3)(Y_1 - Y_2)}$$
$$\frac{\partial C}{\partial Z_3} = 1 - \frac{\partial A}{\partial Z_3}X_3 - \frac{\partial B}{\partial Z_3}Y_3$$
$$= \frac{X_1 Y_2 - X_2 Y_1}{(X_1 - X_2)(Y_1 - Y_3) - (X_1 - X_3)(Y_1 - Y_2)}$$

When the values obtained from Equations 12 to 14 are substituted into Equation 11, the correction constants $\alpha$, $\beta$ and $\gamma$ at the position $(x, y)$ of the fourth damper where a vertical acceleration sensor is not installed can be obtained as Equation 15 from the position coordinate values $(X_1, X_2, X_3)$ and $(Y_1, Y_2, Y_3)$ of the three vertical acceleration sensors 10, 12 and 14.

$$\alpha(x, y) = \frac{(Y_2 - Y_3)x + (X_3 - X_2)y + X_2 Y_3 - X_3 Y_2}{(X_1 - X_2)(Y_1 - Y_3) - (X_1 - X_3)(Y_1 - Y_2)} \quad (15)$$
$$\beta(x, y) = \frac{(Y_3 - Y_1)x + (X_1 - X_3)y + X_3 Y_1 - X_1 Y_3}{(X_1 - X_2)(Y_1 - Y_3) - (X_1 - X_3)(Y_1 - Y_2)}$$
$$\gamma(x, y) = \frac{(Y_1 - Y_2)x + (X_2 - X_1)y + X_1 Y_2 - X_2 Y_1}{(X_1 - X_2)(Y_1 - Y_3) - (X_1 - X_3)(Y_1 - Y_2)}$$

When the correction constants $\alpha$, $\beta$ and $\gamma$ obtained from Equation 15 and the vertical accelerations Aa1, Aa2 and Aa3 of the first to third vertical acceleration sensors 10, 12 and 14 are substituted into Equation 2, the ECU 16 can obtain the vertical acceleration Ad at the position of the fourth damper 24 in which a vertical acceleration sensor is not installed.

Further, the ECU 16 of the present invention corrects the vertical accelerations of the first to third vertical acceleration sensors 10, 12 and 14 to the vertical accelerations at the positions of the first to third dampers 18, 20 and 22 using the following Equation 16.

$$A\alpha_n[1] = \alpha[1] \times A\alpha[1] + \beta[1] \times A\alpha[2] + \beta[1] \times A\alpha[3]$$
$$A\alpha_n[2] = \alpha[2] \times A\alpha[1] + \beta[2] \times A\alpha[2] + \beta[2] \times A\alpha[3]$$
$$A\alpha_n[3] = \alpha[3] \times A\alpha[1] + \beta[3] \times A\alpha[2] + \beta[3] \times A\alpha[3], \quad (16)$$

where $Aa_n[1]$, $Aa_n[2]$ and $Aa_n[3]$ are values corrected to the vertical accelerations at the positions of the first to third dampers. $\alpha[1]$, $\beta[1]$ and $\gamma[1]$ are correction constants at the position of the first damper, $\alpha[2]$, $\beta[2]$ and $\gamma[2]$ are correction constants at the position of the second damper, and $\alpha[3]$, $\beta[3]$ and $\gamma[3]$ are correction constants at the position of the third damper.

For example, as shown in Table 1 below, if the X and Y position coordinate values of the first to third vertical acceleration sensors are given (1500, 1800), (200, 1800) and (1400, 300) and the x and y position coordinate values of the first to fourth dampers are given (1700, 2000), (0, 2000), (1600, 500) and (100, 500), respectively, the correction constants $\alpha$, $\beta$ and $\gamma$ at the positions of the respective dampers are obtained. Then, from the correction constants at the position of the fourth damper and the X and Y position coordinate values of the first to third vertical acceleration sensors, the fourth vertical acceleration, i.e., the vertical acceleration at the position of the fourth damper can be obtained, which is not shown in Table 1.

TABLE 1

|  |  | 1st Vertical Acceleration Sensor | 2nd Vertical Acceleration Sensor | 3rd Vertical Acceleration Sensor | 4th Vertical Acceleration |
|---|---|---|---|---|---|
| Vertical Acceleration Sensor | X | 1500 | 200 | 1400 |  |
|  | Y | 1800 | 1800 | 300 |  |
| Damper | x | 1700 | 0 | 1600 | 100 |
|  | y | 2000 | 2000 | 500 | 500 |
| α |  | 0.405 | 0.030 | 0.276 | 0.876 |
| β |  | 2.471 | 2.292 | −0.143 | 1.164 |
| γ |  | −0.133 | −0.133 | 0.866 | 0.866 |

The ECU 16 of the present invention outputs signals for controlling the damping forces of the first to fourth dampers 18, 20, 22 and 24 in order to improve the ride comfort of the vehicle according to the values corrected to the vertical accelerations at the positions of the first to fourth dampers using the correction constants α, β and γ at the positions of the respective dampers. Thus, the first to fourth actuators 26, 28, 30 and 32 are operated with the damping forces.

Figure 3:
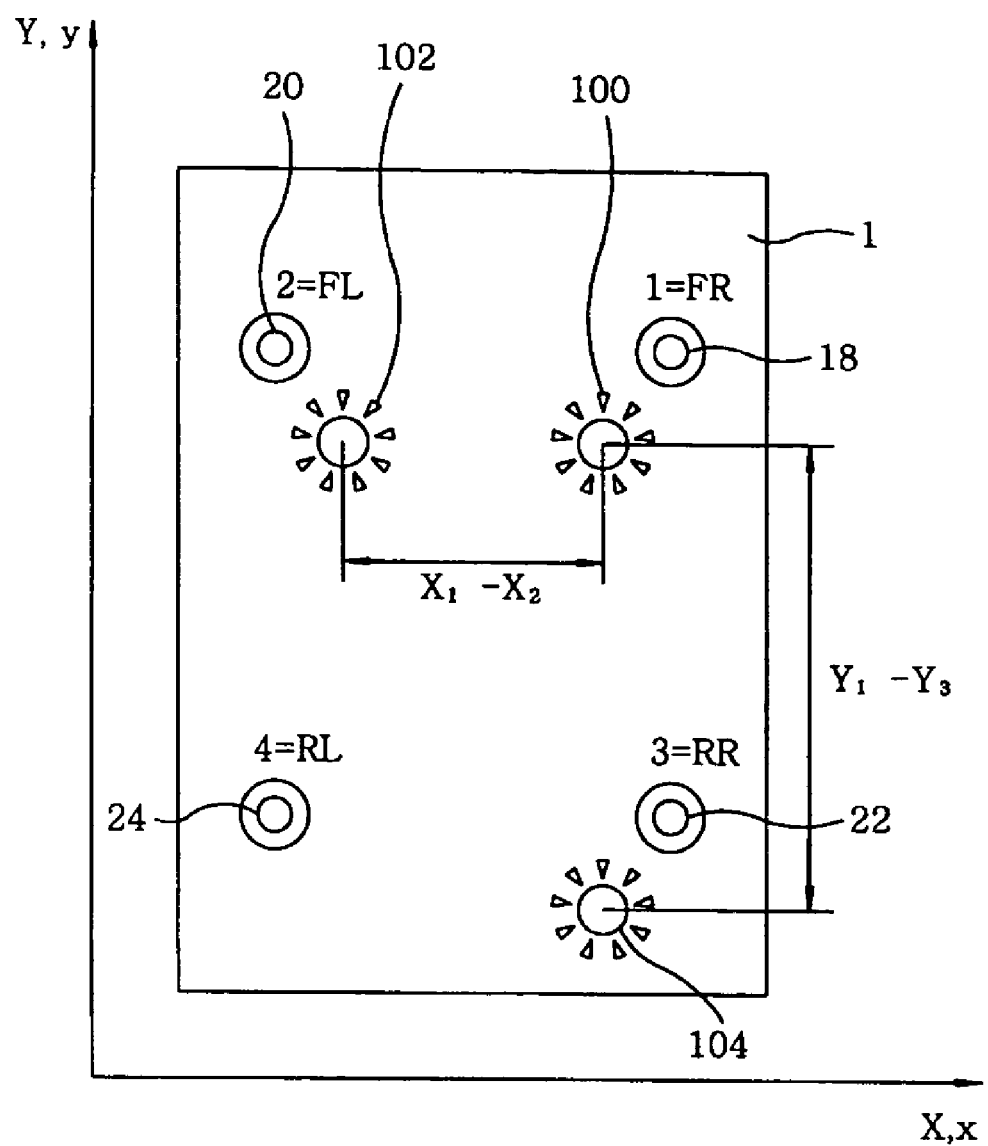
FIG. 3 is a view showing positions of the four dampers and three velocity sensors of the vehicle employing the semi-active suspension system.

FIG. 3 is a view showing the positions of the four dampers and three velocity sensors of the vehicle employing the semi-active suspension system. Referring to FIG. 3, two velocity sensors 100 and 102 are mounted adjacent to the front dampers 18 and 20 of the vehicle body 1, respectively, while a velocity sensor 104 is mounted adjacent to one of the rear dampers 22 and 24. Here, when "X" designates the width direction of the vehicle body and "Y" designates the longitudinal direction thereof, the positions of the two front velocity sensors 100 and 102 are $(X_2, Y_2)$ and $(X_1, Y_1)$, respectively, and the position of the rear velocity sensor 104 is $(X_3, Y_3)$. Since unexplained reference numerals are the same as those shown in FIG. 1, descriptions thereof will be omitted.

In the present invention, correction constants for a velocity at a position where a fourth velocity sensor would be installed are obtained using the X and Y position coordinate values (for example, $X_1$-$X_2$ and $Y_1$-$Y_3$) among the three velocity sensors 100, 102 and 104.

Figure 4:
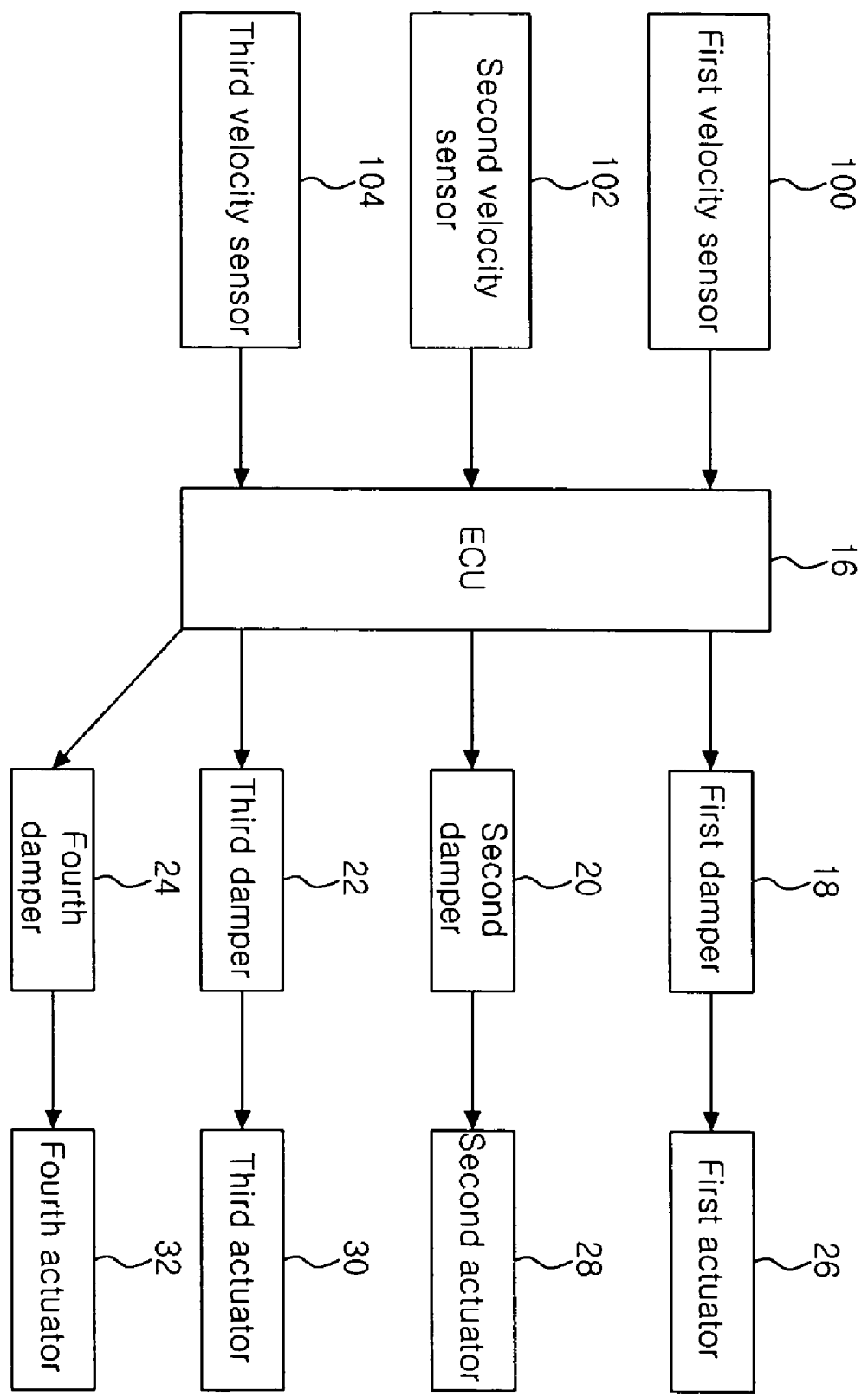
FIG. 4 is a block diagram of a semi-active suspension system, illustrating a method for measuring a velocity according to the present invention.

FIG. 4 is a block diagram of the semi-active suspension system, illustrating a method for measuring a velocity according to the present invention. Referring to this figure, the semi-active suspension system comprises the first to third velocity sensors 100, 102 and 104, the ECU 16, the first to fourth dampers 18, 20, 22 and 24, and the first to fourth actuators 26, 28, 30 and 32. Here, the first to third velocity sensors 100, 102 and 104 are sensors installed adjacent to three of the four dampers on the vehicle body so as to measure the velocity of the vehicle.

In the semi-active suspension system configured as above, the method for measuring the velocity according to the present invention is performed as follows. Meanwhile, since a velocity is obtained by integrating an acceleration in the method for measuring the velocity of the present invention, the same equations as those described in the aforementioned method for measuring the acceleration will be used.

First, velocities Va1, Va2 and Va3 measured by the respective first to third velocity sensors 100, 102 and 104 are input into the ECU 16.

The ECU 16 receives the velocities Va1, Va2 and Va3 measured by the respective first to third velocity sensors 100, 102 and 104 and obtains a fourth velocity Vd using Equation 17 as follows:

$$Vd = \alpha \times Va1 + \beta \times Va2 + \gamma \times Va3, \qquad (17)$$

where α, β and γ are correction constants for the position of the fourth damper where a fourth velocity sensor is not installed, Vd is the fourth velocity, and Va1, Va2 and Va3 are the first to third velocities, respectively.

Referring to Equation 17, the fourth velocity Vd at the position of the fourth damper where a velocity sensor is not installed is obtained by multiplying the vertical velocities Va1, Va2 and Va3 measured in the first to third velocity sensors 100, 102 and 104 by the corresponding correction constants α, β and γ and subsequently summing up the first to third velocities that have been multiplied by the correction constants.

The correction constants α, β and γ by which the respective velocities are multiplied are obtained as follows.

For example, assuming that a plane equation P for the velocity sensors installed on the vehicle body is $Z = AX + BY + C$, all the coordinate values of the respective velocity sensors are included in the equation P.

$$(X_1,Y_1,Z_1),(X_2,Y_2,Z_2),(X_3,Y_3,Z_3) \in P, \qquad (18)$$

where A, B and C are constants, which are expressed as the following Equations 19 to 21, respectively.

$$A = \frac{(Z_1 - Z_2)(Y_1 - Y_3) - (Z_1 - Z_3)(Y_1 - Y_2)}{(X_1 - X_2)(Y_1 - Y_3) - (X_1 - X_3)(Y_1 - Y_2)} \qquad (19)$$

$$B = \frac{(X_1 - X_2)(Z_1 - Z_3) - (X_1 - X_3)(Z_1 - Z_2)}{(X_1 - X_2)(Y_1 - Y_3) - (X_1 - X_3)(Y_1 - Y_2)} \qquad (20)$$

$$\begin{aligned} C &= Z1 - AX1 - BY1 \\ &= Z2 - AX2 - BY2 \\ &= Z3 - AX3 - BY3 \end{aligned} \qquad (21)$$

At this time, assuming that the installation positions of the three velocity sensors are upper points on the dampers and in a common plane, and Y coordinate values of the front first and second velocity sensors are the same (i.e., $Y_1 = Y_2$), the three velocity sensors output the velocities of $\dot{Z}_1$, $\dot{Z}_2$ and $\dot{Z}_3$, respectively.

The plane equation for the first to fourth dampers installed on the vehicle body is considered to be $z = Ax + By + C$, and is then subjected to first differentiation. At this time, the positions of the dampers are expressed using x and y.

$$\frac{dz}{dt} = \frac{dA}{dt}x + \frac{dB}{dt}y + \frac{dC}{dt} \qquad (22)$$

$$\frac{dA}{dt}(Z_1, Z_2, Z_3) = \frac{\partial A}{\partial Z_1}\dot{Z}_1 \frac{\partial A}{\partial Z_2}\dot{Z}_2 \frac{\partial A}{\partial Z_3}\dot{Z}_3, \qquad (23)$$

where $\frac{\partial Z_i}{\partial t} = \dot{Z}_i$.

Since A is a function of Z1, Z2 and Z3 and Z1, Z2, and Z3 are also functions of time, a derivative of A with respect to time is expressed as Equation 23 using a chain rule. That is, Equation 23 can be expressed as Equation 24 by rearranging it according to the velocities of the respective sensors after expanding Equation 23 with respect to respective coefficients.

$$\frac{dz}{dt} = \left(\frac{\partial A}{\partial Z_1}x + \frac{\partial B}{\partial Z_1}y + \frac{\partial C}{\partial Z_1}\right)\dot{Z}_1 + \qquad (24)$$
$$\left(\frac{\partial A}{\partial Z_2}x + \frac{\partial B}{\partial Z_2}y + \frac{\partial C}{\partial Z_2}\right)\dot{Z}_2 +$$
$$\left(\frac{\partial A}{\partial Z_3}x + \frac{\partial A}{\partial Z_3}y + \frac{\partial A}{\partial Z_3}\right)\dot{Z}_3$$

$$\frac{dz}{dt} = \alpha(x,y)\dot{Z}_1 + \beta(x,y)\dot{Z}_2 + \gamma(x,y)\dot{Z}_3 \qquad (25)$$

Thus, the correction constants α, β and γ at the damper positions (x, y) of the dampers are expressed as the following Equation 26.

$$\alpha(x,y) = \frac{\partial A}{\partial Z_1}x + \frac{\partial B}{\partial Z_1}y + \frac{\partial C}{\partial Z_1} \qquad (26)$$
$$\beta(x,y) = \frac{\partial A}{\partial Z_2}x + \frac{\partial B}{\partial Z_2}y + \frac{\partial C}{\partial Z_2}$$
$$\gamma(x,y) = \frac{\partial A}{\partial Z_3}x + \frac{\partial B}{\partial Z_3}y + \frac{\partial C}{\partial Z_3}$$

$$\frac{\partial A}{\partial Z_1}, \frac{\partial A}{\partial Z_2} \text{ and } \frac{\partial A}{\partial Z_3}$$

existing in Equation 26 and the correction constants α, β and γ can be obtained as the following Equation 27.

$$\frac{\partial A}{\partial Z_1} = \frac{Y_2 - Y_3}{(X_1 - X_2)(Y_1 - Y_3) - (X_1 - X_3)(Y_1 - Y_2)} \qquad (27)$$
$$\frac{\partial A}{\partial Z_2} = \frac{Y_3 - Y_1}{(X_1 - X_2)(Y_1 - Y_3) - (X_1 - X_3)(Y_1 - Y_2)}$$
$$\frac{\partial A}{\partial Z_3} = \frac{Y_1 - Y_2}{(X_1 - X_2)(Y_1 - Y_3) - (X_1 - X_3)(Y_1 - Y_2)}$$

Further, $$\frac{\partial B}{\partial Z_1}, \frac{\partial B}{\partial Z_2} \text{ and } \frac{\partial B}{\partial Z_3}$$

existing in Equation 26 and the correction constants α, β and γ can be obtained as the following Equation 28.

$$\frac{\partial B}{\partial Z_1} = \frac{X_3 - X_2}{(X_1 - X_2)(Y_1 - Y_3) - (X_1 - X_3)(Y_1 - Y_2)} \qquad (28)$$
$$\frac{\partial B}{\partial Z_2} = \frac{X_1 - X_3}{(X_1 - X_2)(Y_1 - Y_3) - (X_1 - X_3)(Y_1 - Y_2)}$$
$$\frac{\partial B}{\partial Z_3} = \frac{X_2 - X_1}{(X_1 - X_2)(Y_1 - Y_3) - (X_1 - X_3)(Y_1 - Y_2)}$$

Furthermore, $$\frac{\partial C}{\partial Z_1}, \frac{\partial C}{\partial Z_2} \text{ and } \frac{\partial C}{\partial Z_3}$$

existing in Equation 26 and the correction constants α, β and γ can be obtained as the following Equation 29.

$$\frac{\partial C}{\partial Z_1} = 1 - \frac{\partial A}{\partial Z_1}X_1 - \frac{\partial B}{\partial Z_1}Y_1 \qquad (29)$$
$$= \frac{X_2 Y_3 - X_3 Y_2}{(X_1 - X_2)(Y_1 - Y_3) - (X_1 - X_3)(Y_1 - Y_2)}$$
$$\frac{\partial C}{\partial Z_2} = 1 - \frac{\partial A}{\partial Z_2}X_2 - \frac{\partial B}{\partial Z_2}Y_2$$
$$= \frac{X_3 Y_1 - X_1 Y_3}{(X_1 - X_2)(Y_1 - Y_3) - (X_1 - X_3)(Y_1 - Y_2)}$$
$$\frac{\partial C}{\partial Z_3} = 1 - \frac{\partial A}{\partial Z_3}X_3 - \frac{\partial B}{\partial Z_3}Y_3$$
$$= \frac{X_1 Y_2 - X_2 Y_1}{(X_1 - X_2)(Y_1 - Y_3) - (X_1 - X_3)(Y_1 - Y_2)}$$

When the values obtained from Equations 27 to 29 are substituted into Equation 26, the correction constants α, β and γ at the position (x, y) of the fourth damper where a velocity sensor is not installed can be obtained as Equation 30 from the position coordinate values $(X_1, X_2, X_3)$ and $(Y_1, Y_2, Y_3)$ of the three velocity sensors 100, 102 and 104.

$$\alpha(x,y) = \frac{(Y_2 - Y_3)x + (X_3 - X_2)y + X_2 Y_3 - X_3 Y_2}{(X_1 - X_2)(Y_1 - Y_3) - (X_1 - X_3)(Y_1 - Y_2)} \qquad (30)$$
$$\beta(x,y) = \frac{(Y_3 - Y_1)x + (X_1 - X_3)y + X_3 Y_1 - X_1 Y_3}{(X_1 - X_2)(Y_1 - Y_3) - (X_1 - X_3)(Y_1 - Y_2)}$$
$$\gamma(x,y) = \frac{(Y_1 - Y_2)x + (X_2 - X_1)y + X_1 Y_2 - X_2 Y_1}{(X_1 - X_2)(Y_1 - Y_3) - (X_1 - X_3)(Y_1 - Y_2)}$$

When the correction constants α, β and γ obtained from Equation 30 and the velocities Va1, Va2 and Va3 of the first to third velocity sensors 100, 102 and 104 are substituted into Equation 17, the ECU 16 can obtain the velocity Vd at the position of the fourth damper 24 where a velocity sensor is not installed.

Further, the ECU 16 of the present invention corrects the velocities of the first to third velocity sensors 100, 102 and 104 to the velocities at the positions of the first to third dampers 18, 20 and 22 using the following Equation 31.

$$Va_n[1] = \alpha[1] \times Va[1] + \beta[1] \times Va[2] + \beta[1] \times Va[3]$$

$$Va_n[2] = \alpha[2] \times Va[1] + \beta[2] \times Va[2] + \beta[2] \times Va[3]$$

$$Va_n[3] = \alpha[3] \times Va[1] + \beta[3] \times Va[2] + \beta[3] \times Va[3], \qquad (31)$$

where $Va_n[1]$, $Va_n[2]$ and $Va_n[3]$ are values corrected to the velocities at the positions of the first to third dampers. α[1], β[1] and γ[1] are correction constants at the position of the first damper, α[2], β[2] and γ[2] are correction constants at the position of the second damper, and α[3], β[3] and γ[3] are correction constants at the position of the third damper.

Therefore, when the X and Y position coordinate values of the first to third velocity sensors and the x and y position coordinate values of the first to fourth dampers are given, the correction constants α, β and γ at the positions of the respective dampers are obtained in the ECU 16 of the present invention. Then, from the correction constants at the position of the fourth damper and the X and Y position coordinate values of the first to third velocity sensors, the fourth velocity, i.e., the velocity at the position of the fourth damper, can be obtained. Further, signals for controlling the damping forces of the first to fourth dampers 18, 20, 22 and 24 are output in order to improve the ride comfort of the vehicle according to the values corrected to the velocities at the positions of the first to fourth dampers. Thus, the first to fourth actuators 26, 28, 30 and 32 are operated with the controlled damping forces.

As described above, according to the present invention, the fourth vertical acceleration can be obtained by multiplying the three vertical accelerations measured from the three acceleration sensors by the constants for correcting them to accelerations at actually desired damper positions and subsequently summing up them. Then, by multiplying the vertical accelerations measured from the three acceleration sensors by the correction constants at the corresponding damper positions, the corrected vertical accelerations can be obtained.

Thus, according to the present invention, vertical accelerations at the positions of the dampers can be obtained and the vertical accelerations measured from the sensors can be corrected using the correction constants, so that there is an advantage in that the ride comfort of a vehicle can be more correctly controlled using the corrected vertical accelerations.

In addition, the present invention can be applied to velocity sensors instead of vertical acceleration sensors so as to more correctly control the ride comfort of a vehicle.

The present invention is not limited to the embodiments described above but may be modified or changed in various manners by those skilled in the art within the scope and the technical spirit of the invention defined by the appended claims.

What is claimed is:

1. A method for controlling a semi-active suspension system, wherein the semi-active suspension system comprises the first to third vertical acceleration sensors which are installed adjacent to three of the four dampers of the vehicle body, the method comprises the steps of:

receiving first to third vertical accelerations measured from first to third vertical acceleration sensors;

obtaining a vertical acceleration value (Ad) at the position of the fourth damper using said first to third vertical accelerations and the correction constants $\alpha$, $\beta$, $\gamma$ at the position of the fourth damper where any vertical acceleration sensor is not installed adjacently, wherein the correction constants at the position of the fourth damper is obtained from x and y position value of the fourth damper and X and Y position values of the first to the third acceleration sensors; and controlling damping forces of the first to fourth dampers according to vertical acceleration values including said vertical acceleration value (Ad) at the position of the fourth damper wherein the vertical Acceleration value (Ad) is obtained from the following equation:

$$Ad = \alpha \times Aa1 + \beta \times Aa2 + \gamma \times Aa3$$

and, the correction constants $\alpha$, $\beta$ and $\gamma$ are obtained from the following equation:

$$\alpha(x, y) = \frac{(Y_2 - Y_3)x + (X_3 - X_2)y + X_2Y_3 - X_3Y_2}{(X_1 - X_2)(Y_1 - Y_3) - (X_1 - X_3)(Y_1 - Y_2)}$$

$$\beta(x, y) = \frac{(Y_3 - Y_1)x + (X_1 - X_3)y + X_3Y_1 - X_1Y_3}{(X_1 - X_2)(Y_1 - Y_3) - (X_1 - X_3)(Y_1 - Y_2)}$$

$$\gamma(x, y) = \frac{(Y_1 - Y_2)x + (X_2 - X_1)y + X_1Y_2 - X_2Y_1}{(X_1 - X_2)(Y_1 - Y_3) - (X_1 - X_3)(Y_1 - Y_2)},$$

where $X_1$, $X_2$ and $X_3$ are X position coordinate values of the first to third vertical acceleration sensors, $Y_1$, $Y_2$ and $Y_3$ are Y position coordinate values of the first to third vertical acceleration sensors, and x and y are X and Y position coordinate values of the fourth damper where any vertical acceleration sensor is not installed adjacently.

2. The method as claimed in claim 1, before the step of controlling damping forces of the first to fourth dampers, further comprising the step of correcting the first to third vertical accelerations measured from the first to third vertical acceleration sensors to three vertical acceleration values at the positions of corresponding the first to third dampers using the following equations:

$$Aa_n[1] = \alpha[1] \times Aa[1] + \beta[1] \times Aa[2] + \gamma[1] \times Aa[3]$$

$$Aa_n[2] = \alpha[2] \times Aa[1] + \beta[2] \times Aa[2] + \gamma[2] \times Aa[3]$$

$$Aa_n[3] = \alpha[3] \times Aa[1] + \beta[3] \times Aa[2] + \gamma[3] \times Aa[3]$$

where $Aa_n[1]$, $Aa_n[2]$ and $Aa_n[3]$ are vertical acceleration values corrected to the vertical accelerations at the positions of first to third dampers, $\alpha[1]$, $\beta[1]$ and $\gamma[1]$ are correction constants at the position of the first damper, $\alpha[2]$, $\beta[2]$ and $\gamma[2]$ are correction constants at the position of the second damper, and $\alpha[3]$, $\beta[3]$ and $\gamma[3]$ are correction constants at the position of the third damper.

3. A method for controlling a semi-active suspension system, wherein the semi-active suspension system comprises the first to third velocity sensors which are installed adjacent to three of the four dampers of the vehicle body, the method comprises the steps of:

receiving first to third velocities measured from first to velocity sensors;

obtaining a velocity value (Vd) at the position of the fourth damper using said first to third velocities and the correction constants $\alpha$, $\beta$ and $\gamma$ at the position of the fourth damper where any velocity sensor is not installed adjacently, wherein the correction constants at the position of the fourth damper is obtained from x and y position value of the fourth damper and X and Y position values of the first to the third velocity sensors; and controlling damping forces of the first to fourth dampers according to velocity values including said velocity value (Vd) at the position of the fourth damper wherein the velocity value (Vd) is obtained from the following equation:

$$Vd = \alpha \times V\alpha 1 + \beta \times V\alpha 2 + \gamma \times V\alpha 3$$

and, the correction constants $\alpha$, $\beta$ and $\gamma$ are obtained from the following equation:

$$\alpha(x, y) = \frac{(Y_2 - Y_3)x + (X_3 - X_2)y + X_2Y_3 - X_3Y_2}{(X_1 - X_2)(Y_1 - Y_3) - (X_1 - X_3)(Y_1 - Y_2)}$$

$$\beta(x, y) = \frac{(Y_3 - Y_1)x + (X_1 - X_3)y + X_3Y_1 - X_1Y_3}{(X_1 - X_2)(Y_1 - Y_3) - (X_1 - X_3)(Y_1 - Y_2)}$$

$$\gamma(x, y) = \frac{(Y_1 - Y_2)x + (X_2 - X_1)y + X_1Y_2 - X_2Y_1}{(X_1 - X_2)(Y_1 - Y_3) - (X_1 - X_3)(Y_1 - Y_2)},$$

where $X_1$, $X_2$ and $X_3$ are X position coordinate values of the first to third velocity sensors, $Y_1$, $Y_2$ and $Y_3$ are Y position coordinate values of the first to third velocity sensors, and x and y are X and Y position coordinate values of the fourth damper where any velocity sensor is not installed adjacently.

4. The method as claimed in claim 3, before the step of controlling damping forces of the first to fourth dampers, further comprising the step of correcting the first to third velocities measured from the first to third velocity sensors to three velocity values at the positions of corresponding the first to third dampers using the following equations:

$$Va_n[1]=\alpha[1]\times Va[1]+\beta[1]\times Va[2]+\gamma[1]\times Va[3]$$

$$Va_n[2]=\alpha[2]\times Va[1]+\beta[2]\times Va[2]+\gamma[2]\times Va[3]$$

$$Va_n[3]=\alpha[3]\times Va[1]+\beta[3]\times Va[2]+\gamma[3]\times Va[3]$$

where $Va_n[1]$, $Va_n[2]$ and $Va_n[3]$ are velocity values corrected to the velocities at the positions of first to third dampers, $\alpha[1]$, $\beta[1]$ and $\gamma[1]$ are correction constants at the position of the first damper, $\alpha[2]$, $\beta[2]$ and $\gamma[2]$ are correction constants at the position of the second damper, and $\alpha[3]$, $\beta[3]$ and $\gamma[3]$ are correction constants at the position of the third damper.

* * * * *